Sept. 13, 1955     H. A. QUIST     2,717,517
APPARATUS FOR MEASURING LIQUID CONTENTS
OF FLOATING ROOF TANKS
Filed Dec. 31, 1953     3 Sheets-Sheet 1

INVENTOR.
HAROLD A. QUIST
BY
Robert O. Spindle
ATTORNEY

Sept. 13, 1955 H. A. QUIST 2,717,517
APPARATUS FOR MEASURING LIQUID CONTENTS
OF FLOATING ROOF TANKS
Filed Dec. 31, 1953 3 Sheets-Sheet 2

INVENTOR.
HAROLD A. QUIST
BY
ATTORNEY

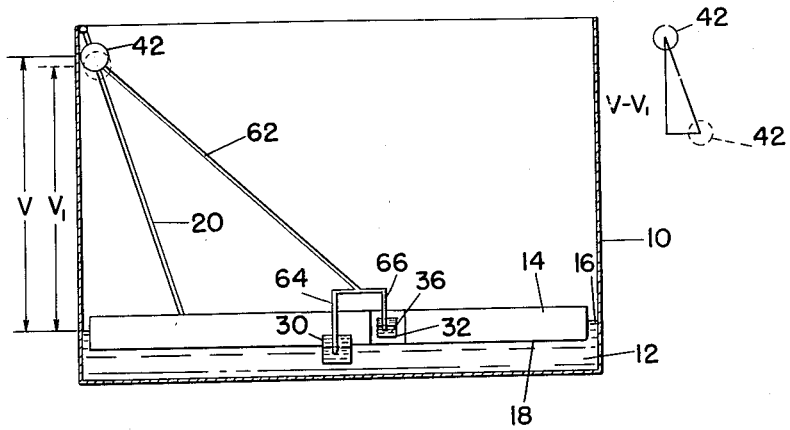
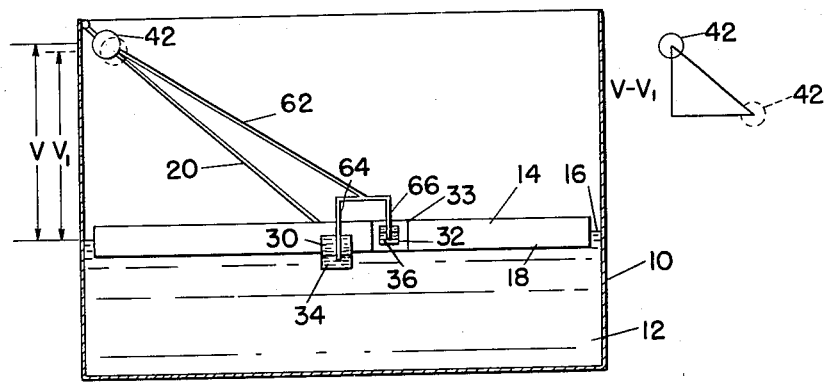
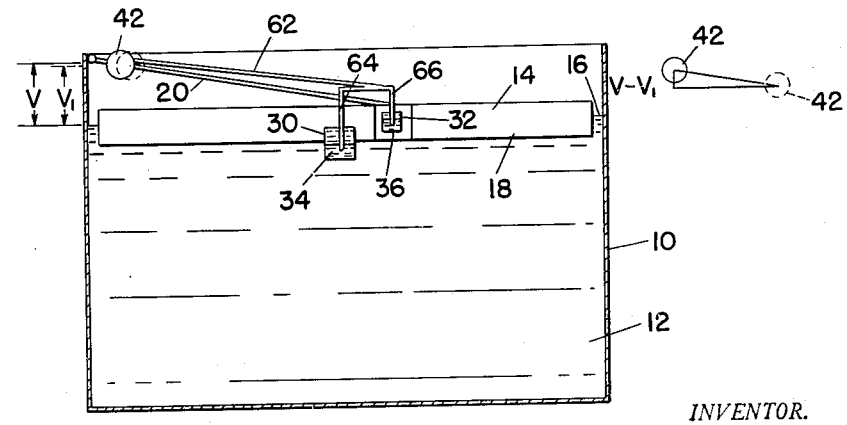

United States Patent Office 2,717,517
Patented Sept. 13, 1955

2,717,517

APPARATUS FOR MEASURING LIQUID CONTENTS OF FLOATING ROOF TANKS

Harold A. Quist, Swarthmore, Pa., assignor to Sun Oil Company, Philadelphia, Pa., a corporation of New Jersey Application December 31, 1953, Serial No. 401,654

3 Claims. (Cl. 73—305)

This invention relates generally to liquid level measuring devices and particularly to such devices which translate liquid pressures by liquid means into an indication of the elevation of the liquid level.

Several forms of apparatus directed to solving this problem are disclosed in copending application Serial No. 327,726, filed December 24, 1952. The combinations of elements shown and described in this presently filed application are directed to indicating liquid levels in both fixed and floating roofed storage tanks. Further, the liquid-level sensing mechanism is shown within the storage vessels requiring fabrication with the vessel when erecting the same, or later installation requiring a major operation. It is an object of this invention to provide a device for use with floating roof tanks which is readily assembled externally of any such tanks with a minimum of labor and lost time.

The remote indication of liquid levels in storage tanks by means of pressure through liquid means introduces problems of relative volumes as affected by temperature. When, as in this case, the pressuring liquids, as distinguished from the stored liquid, are exposed to external conditions, thus being directly affected by atmospheric changes, the liquid level sensing elements must be adjusted for temperature changes as well as corrections made in volumetric content of the stored liquid for temperature changes therein.

In liquid level sensing structures submerged in the stored liquid as suggested in application Serial Number 327,726 previously noted, a measure of the average temperature of the stored liquid which directly affects the pressuring liquid is sufficient for both temperature effects noted above. When the pressuring liquid is exposed to a second set of conditions outside the storage vessel, however, both temperatures must be compensated separately. It is the purpose of this application to provide means for correcting the temperature effects on the pressuring liquids where these liquids are affected by temperatures separate from the stored liquid conditions.

A simple form of liquid level indicating device would be a tube vertically positioned beside the storage vessel and as tall as the highest level reached, in which a responsive liquid is caused to rise and fall in response to the movements of the floating roof. Difficulty in reading such a tube, together with inherent errors arising from the effects of nature on the responsive liquid column, make such a solution impractical. A practical solution to this problem requires a pressuring liquid of relatively high specific gravity as the initial means and pressure transmitting liquids comparatively unresponsive to natural phenomena connecting the effects of the pressuring liquid to an easily read indicating device. Further, to give correct readings, the length of the pressuring liquid should be corrected for the effects of temperature changes for any position of the floating roof. In addition, for accuracy, the indicating device should indicate the volume of liquid displaced by the floating roof, as well as the depth of the liquid body below the liquid control surface of the float.

A principal object of this invention is, therefore, to disclose a liquid level indicating device of the liquid pressure type for use with floating roof storage tanks which corrects the effects of temperature changes acting on the pressuring liquid.

According to the present invention advantage is taken of the variable slope of the ladder which normally extends from the top of a floating roof tank to the upper surface of the floating roof. In cases where such a ladder is not part of the equipment, it is contemplated to use a like element which responds to elevation changes in the floating roof by a change in the slope of the element. As the depth of stored liquid in such a tank increases or decreases, the roof is lifted or lowered, and the slope of the ladder is changed from nearly vertical to approximately horizontal, or vice versa. A bracket arrangement supporting the pressuring liquid reservoir is attached to the ladder and adapted to move in the plane of the ladder for temperature changes. As the effective temperature increases, affecting the specific gravity of the pressuring liquid column, the reservoir is moved upwardly in the plane of the ladder correcting the vertical component of the liquid column to compensate for the change in specific gravity due to the temperature expansion. Under conditions of temperature decreases the reverse action obtains. This movement of the reservoir with its resultant correction of the vertical or effective pressure component of the liquid column operates for any temperature change, transmitting the correct pressure component to the indicating means which shows the exact depth of the stored liquid volume. Two sealed receptacles are positioned centrally of the floating roof and connected to the thermally adjusted reservoir to receive corrected pressure. One is fixed to the floating roof to indicate the elevation of the liquid level contact surface, and the other is floated within the thickness of the roof portion to indicate the level of the roof-displaced stored liquid. An indicator adapted to receive the pressures of the corrected pressuring liquid height as delivered through the fixed and floating sealed chambers is connected to the pressuring liquid by a second liquid means which is immiscible with, and of lesser specific gravity than, the pressuring liquid. These two liquids meet in pressure-transfer relation in the sealed chambers and reflect the elevational differences between them as a measure of volume and operating function. In view of this general description, it may be stated that the general object of this invention is to provide a device for sensing the exact level of the stored liquid in floating roof tanks and transmit all variations in level as a function of pressure which is free of the characteristics of the stored liquid.

With these and further objects in view, the invention consists in the arrangement and combination of parts hereinafter described, claimed and shown in preferred form in the drawings, in which:

Figs. 5, 6 and 7 are diagrammatic views of the device to facilitate a description of the operation.

Figure 1:
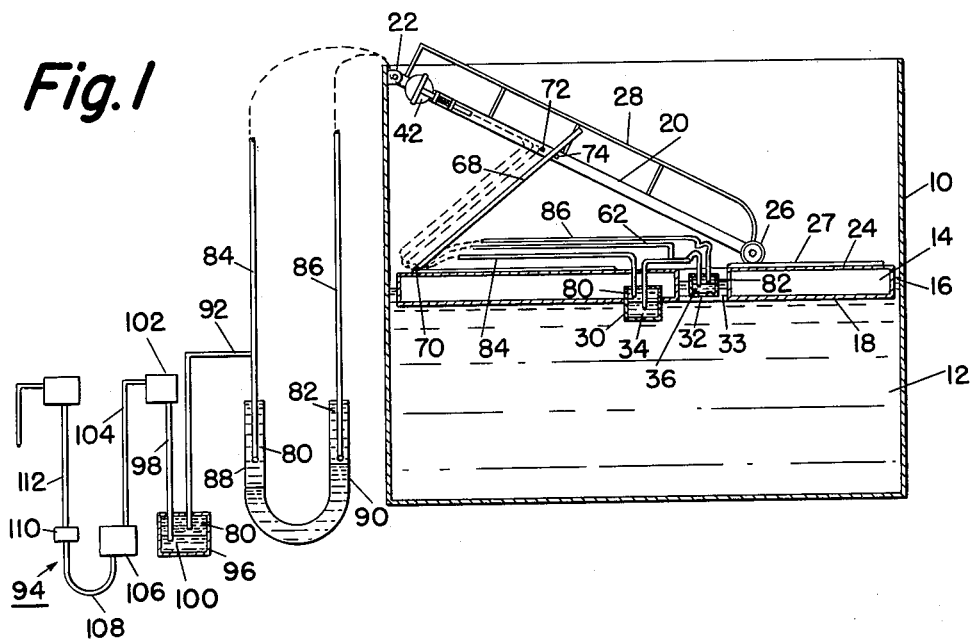
Fig. 1 is a schematic elevational view partly in section of the device in operating arrangement.
Figure 2:
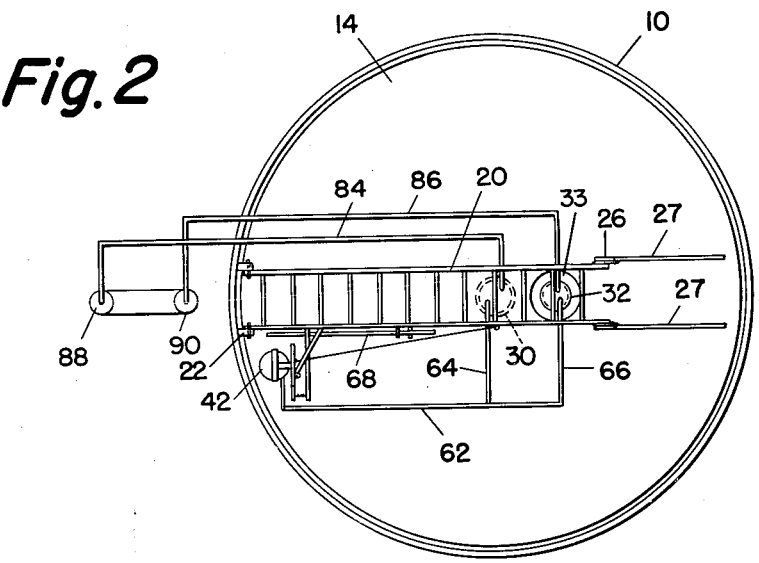
Fig. 2 is a plan view of Fig. 1.

Referring now to the drawings, Figs. 1 and 2 schematically demonstrate the assembly of the device in cooperation with a floating roof tank 10. A body of stored liquid 12 supports a floating roof 14 and assumes a displaced liquid level 16. To ascertain the volume of liquid 12 stored in the tank requires measuring the depth of the liquid below the liquid supported surface 18 of the floating roof 14 and adding to it the volume of the displaced liquid around the periphery and in the hollows of the float which raises the level to that noted by numeral 16. Inventory or accounting accuracy requires further adjustment of the physical volume measured in this manner by correcting the volume to 60° F., or other accepted temperature used as a monetary base. One means for ascertaining this stored volume correction is shown in the application now on file and referred to above. As this element forms no part of the present invention, it will be understood that some known means will measure the stored liquid temperature, if desired, and need not be discussed further in this application.

A conventional ladder 20 pivotally attached at 22 to the tank 10 engages the upper side 24 of the floating roof 14, by rollers or casters 26 in contact with the guide rails 27, and normally forms a part of the standard installation. If this is not on the tank, it is preferred to substitute a similarly responsive element to serve the purpose of a support for the pressuring liquid reservoir to be described later. The hand rail 28 for safety purposes is shown as an added feature. This concludes the normal floating roof tank installation as it is known in the art and with which the liquid elevation measuring elements of this disclosure will be combined.

Sealed chambers 30 and 32 are mounted in the body of the float 14 as near the center as possible. This is normally possible by using existing manheads forming a part of the standard installation. Mounting them centrally, it will be evident, automatically corrects for any errors caused by roof tilt which may be caused by wind pressure, icing or sticking. Chamber 30 is positioned to extend below the liquid contact surface 18 of the floating roof 14 permitting the level of the portion of the pressuring liquid 34 contained therein to be established at the elevation of that surface to indicate that much of the stored liquid volume. Within the vertical thickness of the floating roof 14, the chamber 32 is established as a floating means in the open manhead 33 to permit the portion of the pressuring liquid 36 to assume the level of the displaced liquid shown on the periphery of the floating roof and indicated as 16. This affords the pressure means of establishing the elevation of the stored liquid displaced by the floating roof and which is to be added to determine total stored liquid volume or which, as noted later, indicates normal or improper operation. In this way the two liquid levels shown as 16 and 18 are delineated and established, pressurewise, by one and the same pressuring liquid to be described later, but illustrated by two separate portions 34 and 36 for clarity of description.

The pressuring liquid of which the separate operating portions 34 and 36 form a part in chambers 30 and 32 respectively is inclusively designated by the numeral 40 and is further shown as partially filling the reservoir 42 in which it originates. Because of the varied movement of the reservoir in response to the change of slope of the ladder or other member 20, if required, to which it is attached and the temperature response described later, a spherical shape is shown as the most practical form of container. An opening 44 is positioned to prevent spilling the pressuring liquid 40 but admits atmospheric pressure in all operating positions.

Figure 3:
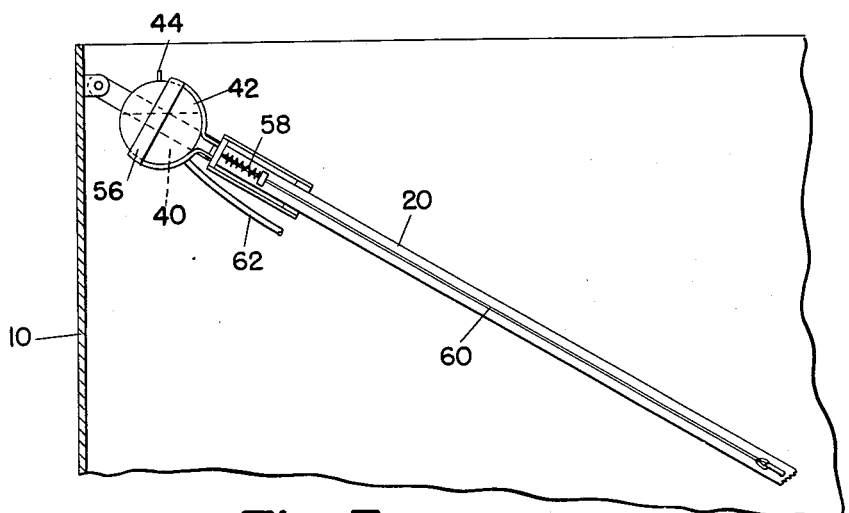
Fig. 3 is an elevational view of a detail of a sub-combination of elements.
Figure 4:
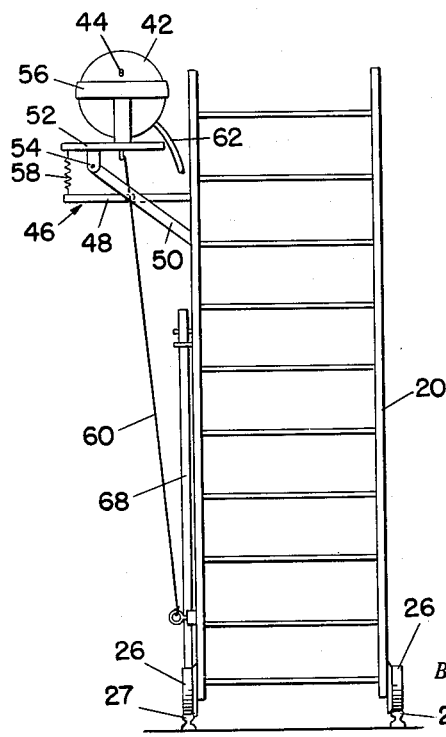
Fig. 4 is a plan view of the structure in Fig. 3 taken on line 4—4.

Reference to Figures 2, 3 and 4, in addition to Figure 1, will clarify the details described above and give a clearer understanding of the temperature correcting elements which follow. In Figure 4, particularly, the bracket 46, including support members 48 and 50 and the supported movable member 52, mounts the spherical reservoir 42. The movable member 52 is pivotally mounted at 54 on member 50 and positions the reservoir 42 in a cage-like framework 56. A spring 58 balances member 52 and the reservoir 42 keeping the temperature responsive member 60 taut at all times. By attaching the member 60 at a determined position on pivoted member 52 and maintaining a relationship between the position of the reservoir-pivot lever arm to the pivot-connection lever arm of the temperature responsive member, the reservoir 42 will be moved upwardly and downwardly in the plane of the ladder 20 a predetermined distance. This distance is regulated to meet the vertical component expansion-contraction requirements of the pressuring liquid 40 as will be understood after reading the description of the operation of the device.

The pressuring liquid system of which portions such as the reservoir 42 and the sealed chambers 30 and 32 have been described also includes a connecting conduit 62 clearly shown in Figure 2. Branches 64 and 66 transfer the pressuring liquid 40 to the chambers 30 and 32 respectively from the conduit 62 supplying the portions 34 and 36 at controlled pressures. All conduit connections to chamber 32 must be flexible to permit free adjustment with the rise and fall of liquid level 16 within and around the float 14.

Although this pressure transmitting system is shown diagrammatically in Figure 2 for clarity, it will be evident that a more practical installation is required under operating conditions. Such an arrangement is indicated in Figure 1. A guide member 68 is hinged to the upper surface of the floating roof 14 as at 70 where the pressuring liquid conduit 62 is flexibly connected for change of direction, and is supported on the side member of the ladder 20 as by the two lugs 72 and 74. These lugs are spaced to permit the guide member 68 to assume almost any angle with the ladder, yet keep this member in comparatively rigid engagement at the assumed angle. Although the conduit 62, and other conduits yet to be named and numbered, require flexible connections at the joints for change of direction, it will be apparent that they may be in the form of rigid conduits between these flexible sections.

As diagrammatically indicated by the dotted lines on Figure 1, the conduit 62 follows the path of the guide member 68 from the floating roof 14 to the ladder 20 and thence to the bracket supported reservoir 42. Such an arrangement prevents the pressuring liquid conduit 62 from coiling on itself and transmitting an erroneous pressure. Further, a coil of conduit lying flat on the floating roof would assume an irregular temperature in the folds of the coil, affecting the accuracy of the device. Additionally, it prevents accidents possible when flexible coils clutter working areas.

The pressuring liquid 40 adjusted in vertical column height by the temperature controls described and later to be made clearer in the operating description, furnishes the initial pressuring means of the liquid level indicating mechanism. The pressure created in the sealed chambers 30 and 32, evidently reflected by the vertical component of the liquid column height measured from the reservoir 42 to the respective chambers, is transferred therein to indicating liquids 80 and 82 respectively filling the upper portions of these chambers. These liquids are immiscible with the bodies of the pressuring liquid 34 and 36, are above the body of the pressuring liquid because of difference in specific gravity, and respond to variations of pressure in the portions 34 and 36 of pressuring liquid 40.

Leading from the upper portion of the sealed chamber 30, conduit 84 follows the path of conduit 62 across the floating roof, up the guide member 68 to the ladder and over the top of tank 10 to one leg of the simple manometer tube 88. Conduit 86 similarly connects the upper volume of chamber 32, by means of a flexible connection as noted, transmitting the pressured liquid volume 82 to the opposite leg 90 of the simple manometer. A branch conduit 92 connects the pressure in conduit 84 to the multiple manometer 94 through the first reading receptacle 96.

For a complete description of the multiple manometer 94 reference is made to the already mentioned application Serial No. 327,726, filed December 24, 1952. In that reference a working description is given of this device, and a practical form for use is suggested. Here the device is used in diagrammatic form as a symbol for any form of pressure indicating mechanism and although described in detail as far as is necessary, will be claimed in the broad sense supplantable by other well known pressure indicators.

Only a few of the several reading sections necessary to the complete instrument here designated as the multiple manometer 94 are shown in the drawing. Those shown, however, are sufficient to indicate one form of liquid level indicator and complete an operating device. In Figure 1, the multiple manometer 94 includes the receptacle 96 adapted to initially receive the pressure from the sealed chamber 30 through conduits 84 and 92. The first reading leg 98 projects downwardly into a body of high specific gravity liquid 100, in the bottom of the receptacle 96. This liquid may be the same as liquid 40 termed the pressuring liquid above, both of which are mercury in the example discussed in the operation of the device, or different liquids of qualities similar to mercury.

At the top of the reading leg 98 an overflow receptacle 102 is arranged to hold the volume of the high specific gravity liquid included in receptacle 96 and reading leg 98, restricting this body of liquid to the initial reading locus. Connecting or pressure transmitting tube 104 connects the overflow receptacle 102 with the second reading receptacle 106, which also has a quantity of high specific gravity or heavy liquid therein separated from the first reading receptacle 96 and leg 98 by the pressuring liquid in 102 and 104. From the bottom of the second reading receptacle 106, a conduit 108 connects with a rectifier receptacle 110. This rectifier receptacle 110 at the base of the second reading column 112 absorbs the differential volume created in adding the reading and pressure transmission volumes from one reading column to the next. Consequently the volumes of the rectifier receptacles 110 and those similar thereto must be large enough to absorb all the volumes of liquid preceding the reading tube which indicates the liquid level. As a result each successive rectifier tube increases in volume to absorb the accumulated volumes previously moved in the instrument. This manometer is open to the atmosphere at the extreme reading end thereby automatically balancing the valve pressure admitted to the pressuring liquid in reservoir 42 through opening 44. As noted above this structure is described and claimed in the application of cross reference, and will not be specifically claimed here.

From a reading of the above description of the elements in the first four figures of the drawing, the operation of the device will be undoubtedly clear to those versed in the art. However, to emphasize the improvements over the known art and to underline the advantages of the combination, a discussion of the principles of operation will be given. To best understand the device, this discussion must include both conditions of rising and falling temperatures when the floating roof is at the same and different levels. As the disclosed mechanism is directed to determining the exact and correct elevation of stored liquid in floating roof storage tanks, only those elements necessary to determine the physical liquid level will be discussed. The theoretical liquid volume in the tank and the necessary temperature determining elements are discussed elsewhere as previously referred to in this paper, and will receive no further mention.

Several critical floating roof positions are shown, schematically, in Figures 5, 6 and 7. In addition small diagrams are shown adjacent each of these figures to which reference will be made in describing the temperature corrective features. The elements previously disclosed in describing Figures 1 to 4, inclusive, are considered to be included in Figures 5, 6 and 7, although not shown in detail. Consequently these elements will be numbered in these operational diagrams as previously noted and where necessary to a clear understanding these details as pictured in the first four figures will be referred to again.

It will be evident that temperature externally of the tank will affect the pressuring liquid, mercury in this instance, as it is fed from the reservoir through conduits 62, 64 and 66 to the sealed chambers 30 and 32 in the floating roof 14. In this specific instance where the distance between the fixed reservoir 42 and the floating roof 14 is constantly varying, the temperature effect on the pressuring liquid must be compensated. A correction constant to be applied mathematically would be correct at only one roof elevation. Therefore the pressuring liquid column must be corrected throughout the range of effective temperature and the limits of the floating roof vertical movement. Further, this correction must be varied between maximum and minimum limits depending upon the effective static head (hydraulically) of the pressuring liquid 40.

Figures 5, 6 and 7 show three positions of the floating roof 14 in the tank 10. The three selected positions are the extremes and an intermediate elevation between the extremes. It will be understood that many elevations can and are assumed, and that, consequently, these three figures are not intended to exhaust all possible elevational positions. They do show the critical positions and will indicate the operability and practicability of the device. In Figure 5, the floating roof 14 is at the lowest operating point and the pressure of the pressuring liquid 40 in the pressuring system is required to indicate the elevation of the supporting and displaced liquid levels 18 and 16 regardless of the effect of outside temperature.

V and $V_1$ indicate the extreme vertical positions of the reservoir 42. This vertical component of the reservoir 42 movement is the only effective pressure component of the reservoir movement along the ladder. In the small triangle to the right of Figure 5, this effective vertical pressure component is shown as V—$V_1$. As the reservoir moves along the plane of the ladder represented by the hypotenuse of the triangle, the vertical component will be different for every change in slope of the ladder. Further, referring to Figure 4, the extent of the hypotenuse movement of the reservoir between the extremes shown will depend on the temperature effect on member 60. This relationship is made exact between the temperature response of the member 60 and the pressuring liquid, mercury for example, by the location of the reservoir and the member 60 fastening both relative to the pivot 54. Thus when the temperature affects the specific gravity of the mercury pressuring liquid 40, the column of liquid is increased or decreased by movement along the ladder to vary the vertical component of the pressure as required for the particular elevation of the floating roof.

Specific examples as illustrated in Figures 5, 6 and 7 will be discussed to emphasize the above summary of operation. The expansion and contraction of mercury in thermometers is well known. Theoretically it would be possible to use this feature of mercury in this instance if it were also possible to utilize an exact quantity of mercury in a tube of exact cross-section throughout its length. These difficulties, taken together with the impossibility of keeping an exact quantity of mercury in operation due to evaporation, requires an adjustable reservoir, as disclosed, to correct the vertical pressuring component.

At a specific elevation of the reservoir 42 in Figure 5, the effective static head of the mercury 40 creates a pressure in sealed chambers 30 and 32 that indicates the liquid elevation in tank 10.

This condition would obtain for only one position of reservoir 42 if that reservoir were fixed. However, the vertical column which pressurizes the sealed chambers 30 and 32 must be adjusted for the effect of temperature and such adjustment, as indicated above, is required to be different depending upon the vertical elevation of the floating roof. Therefore, in the lowermost position, as shown in Figure 5, under high temperature conditions, where the pressuring liquid 40 is reduced in specific gravity, the thermal responsive member (Figure 4) expands, permitting the reservoir 42 to rise, thereby lengthening the effective pressuring liquid column to compensate for the thermal specific gravity effect. As the relationship of the movement of the reservoir 42 in the plane of the ladder is controlled by the thermal response of member 60 and the relationship of the lever arms pivotally supporting the reservoir, the vertical component of the pressure vector in this figure will be greater than in either of the Figures 6 and 7. This vector, noted as V—$V_1$ on the diagrammatic sketch adjacent Figure 5, is a pressure vector for the movement of the reservoir 42 from the dotted position at the bottom of the triangle to the full line position at the top along the hypotenuse.

Should the temperature go down in the reverse movement to that considered above, the movement of the reservoir 42 would be downward along the hypotenuse of the triangle, thereby diminishing the pressure of the liquid column by the amount of the vertical vector V—$V_1$. It appears to be evident that this will diminish the height of the pressuring liquid column in the proper amount required to compensate for the increase in the specific gravity of the pressuring liquid caused by the fall in temperature.

Consideration of Fig. 6 in view of the immediately preceding discussion will show that the correction vertical vector will be less for the extreme thermal positions of reservoir 42 in direct relationship with the slope of the ladder 20. This is further evident in the diagrammatic sketch of the reservoir positions shown to the right of Figure 7. Consequently, it can be stated that the correction vector of the vertical component of the pressuring liquid will be in proper proportion to the length of the column static head of the pressuring liquid column corrected by slope of the ladder to correctly adjust the thermal effect in accordance with the length of the pressuring liquid column.

The effect of the pressuring liquid 40, thermally corrected by means of automatically adjusting the vertical vector to compensate for the temperature effects, is transmitted to the sealed chambers in the floating roof. This pressure is transmitted by liquids in the conduits 84 and 86 which extend over the top of the floating tank 10 and into engagement with the separate manometer and the multiple leg manometer, or similar indicating mechanism, as shown in Fig. 1.

As noted above in the detailed description, the pressure created in the float supported and guided sealed chambers 30 and 32 is received in a transmission liquid in conduits 84 and 86. The characteristics of this second, or transmitting liquid, have been indicated merely as being non-miscible with and of a specific gravity less than the pressuring liquid. Further limitations of non-freezing, non-expandable and non-compressible within normal operating temperatures are desirable conditions which should also be considered for this liquid or liquids, if separate liquids are desired. As mercury is used for the primary, first or pressuring liquid and all the pressuring head (hydraulic) adjustment described above is directed to correcting for the use of that liquid, a mixture of glycol and water is used for the second, or transmitting liquid. If desired to show two liquids operating in the simple manometer legs 88 and 90, separate liquids like this mixture to which coloring matter has been added may be substituted for the glycol-water mixture used in this example.

The separate legs of the simple manometer receive, in opposition, the pressures from sealed chambers 30 and 32 through the action of the transmitting liquid noted above. The differential in height of these chambers within the structure of the floating roof 14, located to indicate separately the supporting level of the stored liquid under the floating roof, and the displaced level of the liquid within the hollows and around the periphery of the floating roof, will give an unbalanced indication in the legs of the simple manometer. The lower sealed chamber 30, because of its greater pressure head, will always indicate a greater pressure condition. The difference between the height of the indicating liquid in the simple manometer legs represents a check on the immersion of the floating roof and incidentally gives an indication of the operability of the device, and any sinking or sticking is readily recognized.

The transfer of the greater pressure, as received through the lower of the sealed chambers, to the multiple leg manometer is for the purpose of indicating the true level of the liquid contact surface, or under side, of the floating roof. Reference is again made to the application Ser. No. 327,726, repeatedly noted above, for a full discussion of this form of indicating device. By means of the pressure and the transmission of that pressure through the various reading and transmitting legs of this multiple legged manometer, the height of the floating roof is easily detected and transferred into a liquid volume measurement if desired. By reference to the simple manometer, the added quantity of stored liquid rising around the floating roof as displaced can be added to obtain an exact measurement. For accounting or inventory purposes, by reading the average temperature of the stored liquid and making the proper calculation, the measured volume as here indicated can readily be referred back to a basic temperature and a proper record made.

From the above description of the device and its operation, it is apparent that a liquid level indicating device for use externally of a floating roof tank and which is automatically compensated for external temperature effects is demonstrated. It is further apparent that the above device permits of many variations and substitutions yet will remain within the spirit of the invention. It is the intention of the inventor that such substitutions and variations are included herein, to the extent of the coverage indicated in the appended claims.

What is claimed is:

1. In combination with a floating roof storage tank, a liquid level measuring system including a member extending from the side of the tank into rolling contact with the floating roof and adapted to change slope with relation to the roof elevation, a pressuring liquid reservoir pivotally connected to said member for movement in the plane thereof, temperature responsive means controlling the reservoir movement, level sensing means of the liquid type positioned in said roof and operably connected to receive pressuring liquid from said reservoir, and liquid pressure measuring means calibrated to read liquid level heights connected to said level sensing means.

2. A liquid level measuring system for use with floating roof tanks having a sloping ladder adjustably engaging the roof comprising a sealed chamber fixed in the roof and positioned to maintain pressuring liquid to indicate the elevation of the stored liquid contact surface of the roof, a second sealed chamber floatably secured in an opening in said roof with pressuring liquid therein to indicate the level of stored liquid as it is displaced by said floating roof, a pressuring liquid reservoir pivotally supported by the sloping ladder and longitudinally movable of said ladder and in the plane thereof, conduit connection between the reservoir and said sealed chambers, a temperature responsive member positioning the reservoir in the plane of the ladder responsively to the effects of temperature thereon, and liquid pressure measuring means operably connected to said sealed chambers to indicate the differential pressures therebetween and the elevation of the roof to liquid contact surface.

3. A liquid level measuring system for use with floating roof tanks comprising a reservoir adapted to contain pressuring liquid, a sloping member means movably connected to the top of the wall of the tank and extending into operating engagement with the floating roof so that the slope of said member with the tank wall varies directly with the vertical movement of said roof, pivot means mounting said reservoir on the sloping member means above the floating roof, temperature responsive means connecting the pivotally mounted reservoir to the sloping member means thermally adjusting the longitudinal position of said reservoir relative to the sloping member means in the plane determined by the slope of said means, liquid level sensing means operably connected to the floating roof, pressure measuring means calibrated to indicate liquid level heights, and conduit means connecting the reservoir to the liquid level sensing means and said sensing means with the pressure measuring means.

References Cited in the file of this patent

UNITED STATES PATENTS

| | | |
|---|---|---|
| 723,040 | Schmitz | Mar. 17, 1903 |
| 2,674,128 | Beam | Apr. 6, 1954 |